(12) United States Patent
Lin

(10) Patent No.: US 8,922,184 B2
(45) Date of Patent: Dec. 30, 2014

(54) INTEGRATED SWITCH-CAPACITOR DC-DC CONVERTER AND METHOD THEREOF

(75) Inventor: Chia-Liang Lin, Fremont, CA (US)

(73) Assignee: Realtek Semiconductor Corp., Hsinchu (TW)

( * ) Notice: Subject to any disclaimer, the term of this patent is extended or adjusted under 35 U.S.C. 154(b) by 407 days.

(21) Appl. No.: 13/426,720

(22) Filed: Mar. 22, 2012

(65) Prior Publication Data

US 2013/0249506 A1    Sep. 26, 2013

(51) Int. Cl.
*G05F 1/00*    (2006.01)

(52) U.S. Cl.
USPC .......................................... 323/283; 323/282

(58) Field of Classification Search
USPC .......... 323/222–225, 234, 271–275, 282–285
See application file for complete search history.

(56) References Cited

U.S. PATENT DOCUMENTS

| | | | | |
|---|---|---|---|---|
| 3,872,389 | A * | 3/1975 | Willard ............................ | 327/99 |
| 5,278,702 | A * | 1/1994 | Wilson et al. .................... | 360/51 |
| 6,642,873 | B1 * | 11/2003 | Kuang ............................ | 341/143 |
| 8,390,347 | B1 * | 3/2013 | Sinha et al. ..................... | 327/156 |
| 2005/0030771 | A1 * | 2/2005 | Conte et al. ..................... | 363/59 |
| 2006/0006852 | A1 * | 1/2006 | Mashiko ......................... | 323/272 |
| 2007/0069780 | A1 * | 3/2007 | Kim ................................. | 327/158 |
| 2007/0146024 | A1 * | 6/2007 | Allan ............................... | 327/156 |
| 2007/0153940 | A1 * | 7/2007 | Oishi .............................. | 375/333 |
| 2008/0024342 | A1 * | 1/2008 | Deval et al. ..................... | 341/143 |
| 2008/0048904 | A1 * | 2/2008 | Lee et al. ........................ | 341/187 |
| 2008/0211582 | A1 * | 9/2008 | Lin ................................. | 330/278 |
| 2008/0272952 | A1 * | 11/2008 | Wood ............................. | 341/166 |
| 2009/0015303 | A1 * | 1/2009 | Kim ................................. | 327/159 |
| 2009/0302815 | A1 * | 12/2009 | Tanzawa ......................... | 323/282 |
| 2010/0181979 | A1 * | 7/2010 | Abe et al. ....................... | 323/282 |
| 2011/0310659 | A1 * | 12/2011 | Seol et al. ....................... | 365/149 |
| 2012/0013314 | A1 * | 1/2012 | Tanzawa ......................... | 323/267 |
| 2012/0043973 | A1 * | 2/2012 | Kremin ........................... | 324/658 |
| 2012/0176169 | A1 * | 7/2012 | Sinha et al. ..................... | 327/156 |
| 2013/0058437 | A1 * | 3/2013 | Oshima et al. ................. | 375/316 |

* cited by examiner

*Primary Examiner* — Timothy J Dole
*Assistant Examiner* — Yusef Ahmed
(74) *Attorney, Agent, or Firm* — McClure, Qualey & Rodack, LLP

(57) ABSTRACT

An integrated switch-capacitor DC-DC converter and method are disclosed. In an embodiment, a converter includes a switch-capacitor network for receiving a source voltage and outputting a load voltage to a load circuit in accordance with a N-bit control code and a plurality of phase clocks, wherein N is an integer greater than 1, a load capacitor for holding the load voltage, a feedback network for generating a feedback voltage proportional to the load voltage, and a controller for receiving the feedback voltage and a reference voltage and outputting the N-bit control code in accordance with a clock phase of the plurality of phase clocks.

16 Claims, 4 Drawing Sheets

INTEGRATED SWITCH-CAPACITOR DC-DC CONVERTER AND METHOD THEREOF

FIELD OF INVENTION

This present invention generally relates to DC-DC converters and more particularly to integrated switch-capacitor DC-DC converters.

BACKGROUND

A conventional DC-DC converter receives a first DC voltage from a power supply and outputs a second DC voltage to a load circuit. There are generally two types of DC-DC converters: switching regulators and linear regulators. Switching regulators are more power efficient but require large external passive components (inductors and capacitors) and therefore not cost/size effective for mixed-signal SoC (Systems on Chips) applications that require multiple independent power supply domains for various circuits. Also, switching regulators are often noisy due to switching. Linear regulators, on the other hand, are more cost/size effective and less noisy, but are not power efficient.

Accordingly, what is desired are DC-DC converters that are approximately as cost/size effective and clean as linear regulators, but also more power efficient, like switching regulators.

SUMMARY

In an embodiment, an apparatus comprises: a switch-capacitor network for receiving a source voltage and outputting a load voltage to a load circuit in accordance with a N-bit control code and a plurality of phase clocks, wherein N is an integer greater than 1; a load capacitor for holding the load voltage; a feedback network for generating a feedback voltage proportional to the load voltage; and a controller for receiving the feedback voltage and a reference voltage and outputting the N-bit control code in accordance with a clock phase of the plurality of phase clocks. The switch-capacitor network comprises a parallel connection of N switch units, wherein each switch unit includes a charging capacitor for receiving a charge from the source voltage and sharing the charge with the load voltage in a manner controlled by a respective bit of the N-bit control code and a respective phase of the plurality of phase clocks. The controller outputs the N-bit control code so that in a steady state the number of bits of the N-bit control bits that are asserted is steady yet each individual bit of the N-bit control code toggles often.

In another embodiment, a method comprises: receiving a source voltage; receiving a reference voltage; receiving a plurality of phase clocks comprising a plurality of clock phases; coupling a load circuit to a load node; holding a load voltage at the load node with a load capacitor; deriving a feedback voltage from the load voltage such that the feedback voltage is proportional to the load voltage; updating a N-bit control code in response to a comparison between the feedback voltage and the reference voltage in a timely manner controlled by one of the plurality of clock phases; and transferring charge from the source voltage to the load voltage via a switch-capacitor network controlled by the plurality of phase clocks and the N-bit control code. The switch-capacitor network comprises a parallel connection of N switch units, wherein each switch unit includes a charging capacitor for receiving a charge from the source voltage and sharing the charge with the load voltage in a manner controlled by a respective bit of the N-bit control code and a respective phase of the plurality of phase clocks. The N-bit control code is updated so that in a steady state the number of bits of the N-bit control bits that are asserted is steady yet each individual bit of the N-bit control code toggles frequently.

DETAILED DESCRIPTION

The following detailed description refers to the accompanying drawings which show, by way of illustration, various embodiments in which the invention may be practiced. These embodiments are described in sufficient detail to enable those skilled in the art to practice these and other embodiments. The various embodiments are not necessarily mutually exclusive, as some embodiments can be combined with one or more other embodiments to form new embodiments. The following detailed description is, therefore, not to be taken in a limiting sense.

Figure 1:
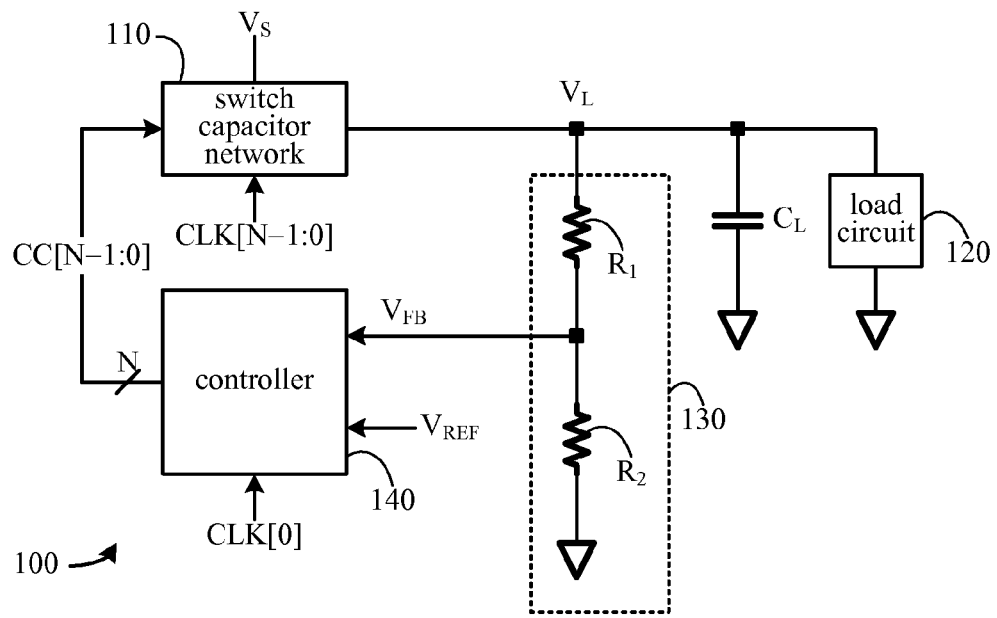
FIG. 1 shows a functional block diagram of a switch-capacitor DC-DC converter in accordance with an embodiment of the present invention.

A functional block diagram of a switch-capacitor DC-DC converter 100 in accordance with the present invention is depicted in FIG. 1. Converter 100 receives a source voltage $V_S$ and outputs a load voltage $V_L$ to a load circuit 120. Converter 100 comprises: a switch-capacitor network 110 for receiving the source voltage $V_S$ and outputting the load voltage $V_L$ in accordance with a N-bit control code CC[N−1:0] and a N-phase clock CLK[N−1:0], where N is an integer greater than 1; a load circuit 120 as a termination to the load voltage $V_L$; a load capacitor $C_L$ for holding the load voltage $V_L$; a feedback circuit 130 for receiving the load voltage $V_L$ and outputting a feedback voltage $V_{FB}$; a controller 140 for receiving the feedback voltage $V_{FB}$ and a reference voltage $V_{REF}$ and outputting said N-bit control code CC[N−1:0] in accordance with a first phase CLK[0] of said N-phase clock CLK[N−1:0]. The feedback circuit 130 is embodied by a resistive voltage divider comprising two resistor $R_1$ and $R_2$, so that $V_{FB}=V_L \cdot R_2/(R_1+R_2)$. In a closed-loop manner, the controller 140 outputs the N-bit control code CC[N−1:0] to control the switch-capacitor network 110 so as to make the feedback voltage $V_{FB}$ track the reference voltage $V_{REF}$, and therefore the load voltage $V_L$ track $V_{REF} \cdot (1+R_1/R_2)$.

Figure 2:
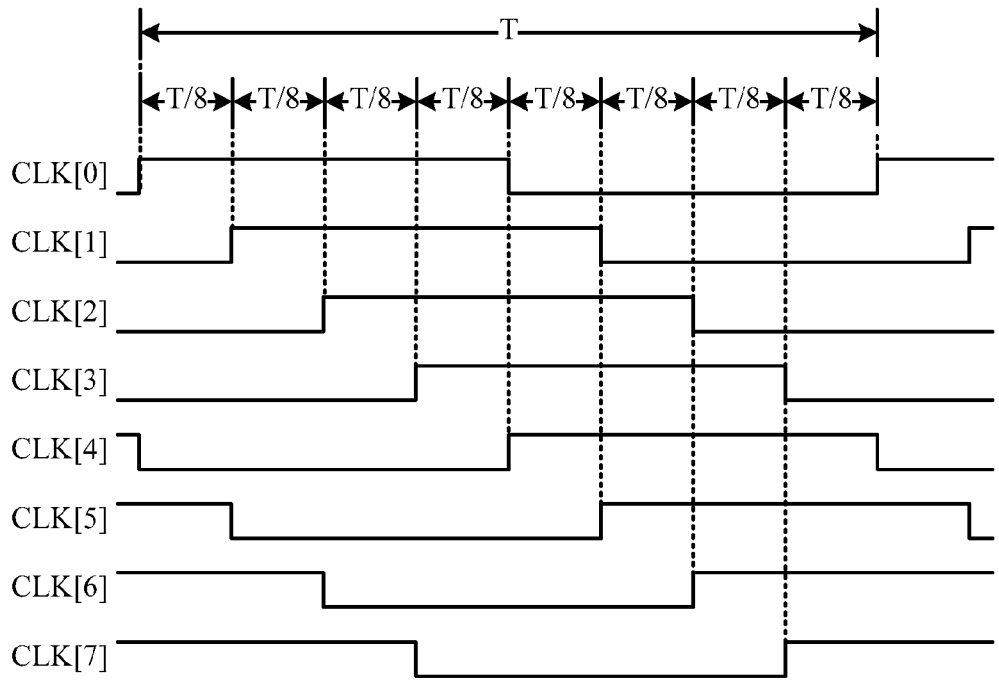
FIG. 2 shows an exemplary timing diagram of a multi-phase clock for the converter of FIG. 1.

The N-phase clock CLK[N−1:0] comprises N phases that are uniformed displaced in time, with a spacing of T/N between two adjacent phases, where T is a clock period. An exemplary timing diagram of the N-phase CLK[N−1:0] for N=8 is shown in FIG. 2.

Figure 3:
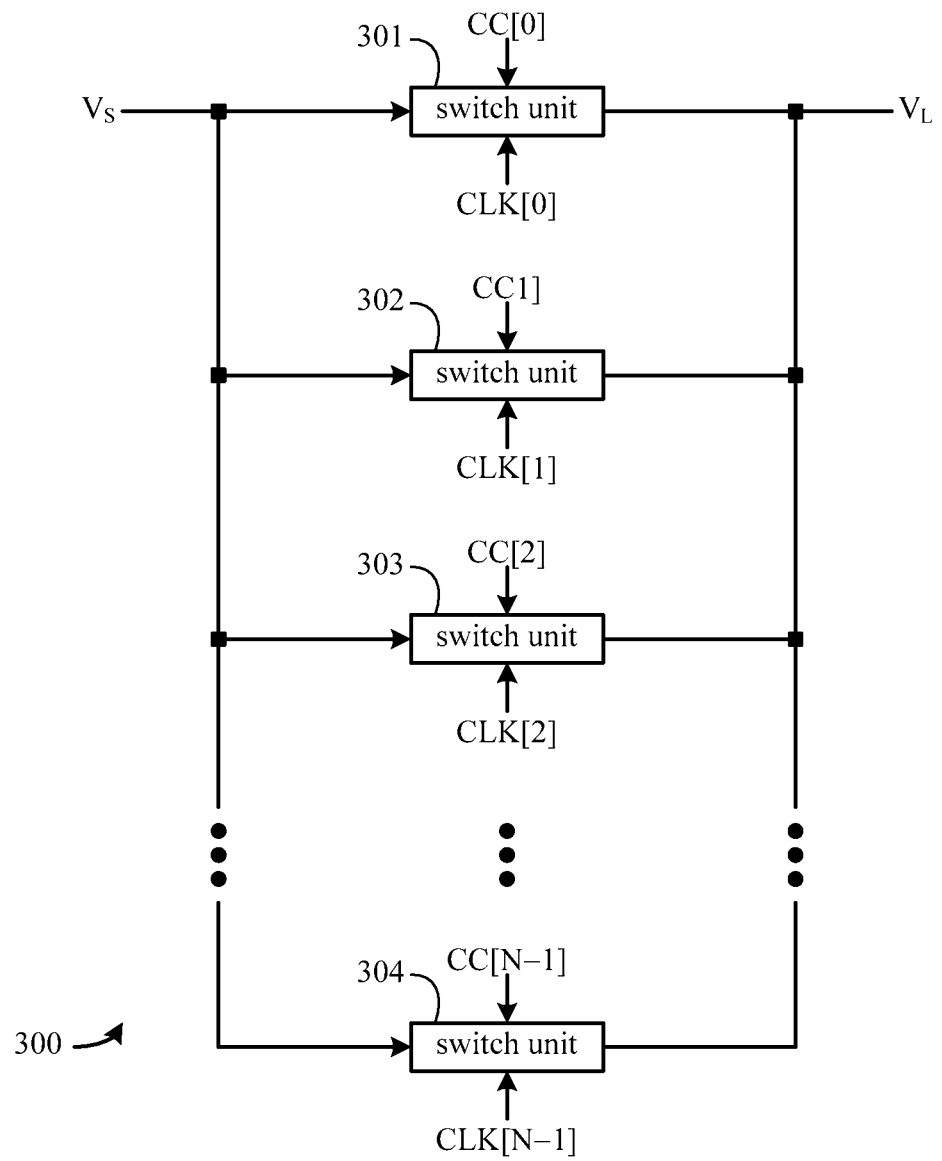
FIG. 3 shows a functional block diagram of a switch-capacitor network for the converter of FIG. 1.
Figure 4:
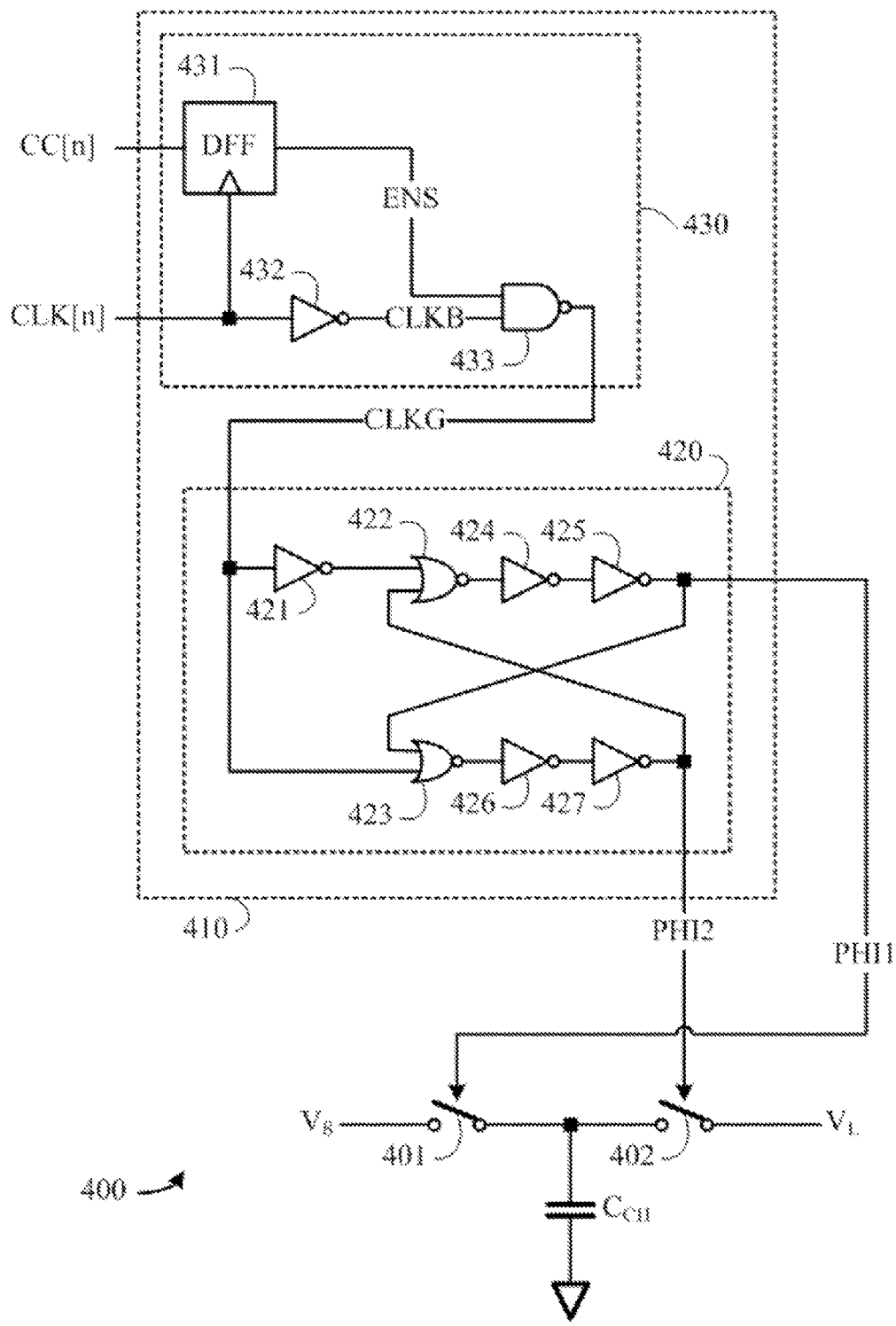
FIG. 4 shows a schematic diagram of a switch unit for the switch-capacitor network of FIG. 3.

An exemplary embodiment of a switch-capacitor network 300 suitable for embodying switch-capacitor network 110 of FIG. 1 is shown in FIG. 3. Switch-capacitor network 300 comprises a parallel connection of N switch units 301, 302, 303, . . . , and 304; each switch unit couples to the source voltage $V_S$ on the source side and to the load voltage $V_L$ on the load side in accordance with a respective bit of the control code CC[n] and a respective clock phase CLK[n], for n=0, 1, 2, . . . , and N−1; each switch unit works in a two-phase switch-capacitor manner to transfer charge from the source side to the load side. FIG. 4 depicts a schematic diagram of a switch unit 400 suitable for embodying switch units 301, 302, 303, . . . , and 304 of FIG. 3. Switch unit 400 couples to the source voltage $V_S$ on the source side and to the load voltage $V_L$ on the load side in accordance with the respective bit of the control code CC[n] and the clock phase CLK[n], where n=0, 1, 2, . . . , N−1 for embodying switch units 301, 302, 303, . . . , and 304, respectively. Switch unit 400 comprises a charging capacitor $C_{CH}$, a first switch 401 controlled by a first logical signal PHI1, and a second switch 402 controlled by a second logical signal PHI2. The first logical signal PHI1 and the second logical signal PHI2 form a non-overlapping two-phase clock, where PHI1 and PHI2 are never concurrently asserted; in a charging phase wherein PHI1 is asserted, the charging capacitor $C_{CH}$ is charged by the source voltage (i.e. $V_S$) via the first switch 401; in a sharing phase wherein PHI2 is asserted, the charge on the charging capacitor $C_{CH}$ is shared with the load voltage (i.e. $V_L$) via the second switch 402. Switch unit 400 further comprises a clock gating circuit 430 for gating the clock signal CLK[n] in accordance with the respective bit of the control code CC[n], resulting in a gated clock CLKG; and a two-phase non-overlapping clock generator 420 for receiving the gated clock CLKG and outputting the non-overlapping two-phase clock (i.e., PHI1 and PHI2).

The clock gating circuit 430 comprises: a data flip flop (DFF) 431 for sampling the respective bit of the control code CC[n] with the clock signal CLK[n], resulting in a synchronized control signal ENS; an inverter 432 for receiving the clock signal CLK[n] and outputting an inverted clock signal CLKB; and a NAND gate 433 for receiving the synchronized control signal ENS and the inverted clock signal CLKB and outputting the gated clock signal CLKG. The two-phase non-overlapping clock generator 420 comprises inverters 421, 424, 425, 426, and 427, and NOR gates 422 and 423. The two-phase non-overlapping clock generator 420 is well known in prior art and thus there is no need to be explained in detail here. By using the combination of the clock gating circuit 430 and the two-phase non-overlapping clock generator 420, the charge on the charging capacitor $C_{CH}$ will be shared with the load in accordance with a timing determined by the clock signal CLK[n] when the respective bit of the control code CC[n] is asserted.

Referring back to FIG. 3, each switch unit (301-304) has a respective clock signal CLK[n] and a respective bit of the control code CC[n] (for n=0, 1, 2, . . . , and N−1). Within each switch unit, there is a charging capacitor and a pair of switches (see FIG. 4) controlled by a respective two-phase non-overlapping clock. The charging capacitor receives charge from the source voltage $V_S$, and shares the charge with the load voltage $V_L$ in a timing determined by the respective clock phase CLK[n] when the respective bit of the control code CC[n] is asserted. For each individual switch unit, the more often the respective bit of the control code CC[n] is asserted, the more the charge received from the source is transferred to the load and therefore the higher the load voltage $V_L$ will be. For the switch network 300 as a whole, the more bits of the control code CC[N−1:0] are asserted, the more total charge is transferred to the load.

Referring back to FIG. 1, controller 140 controls the control code CC[N−1:0] so as to make the feedback voltage $V_{FB}$ track the reference voltage $V_{REF}$. If $V_{FB}$ is lower than $V_{REF}$, more bits of the control code CC[N−1:0] will be asserted to help to raise the load voltage $V_L$ (and accordingly raise the feedback voltage $V_{FB}$). Otherwise, fewer bits of the control code CC[N−1:0] will be asserted to help to lower the load voltage $V_L$ (and accordingly lower the feedback voltage $V_{FB}$). In a steady state, the feedback voltage $V_{FB}$ is approximately equal to the reference voltage $V_{REF}$, and the number of bits of the N-bit control code CC[N−1:0] that are asserted is steady (i.e., either fixed or slightly fluctuating).

Figure 5:
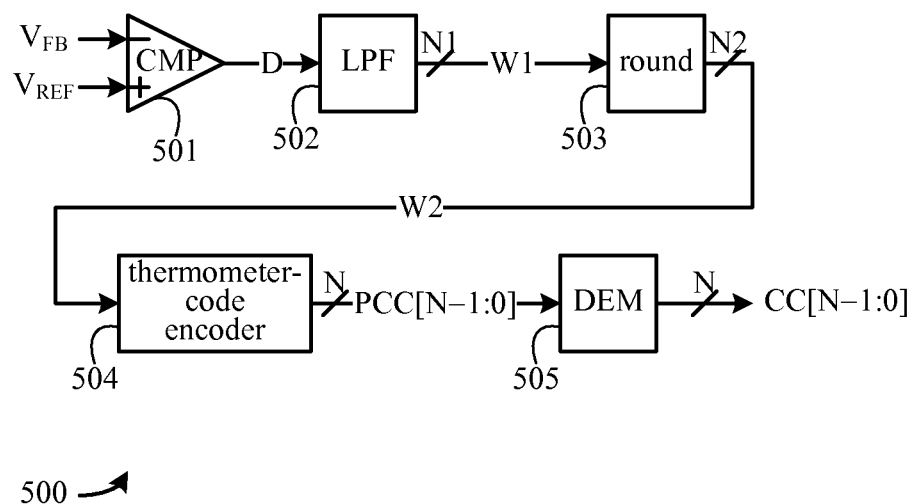
FIG. 5 shows a controller for the converter of FIG. 1

FIG. 5 depicts a functional block diagram of a controller 500 suitable for embodying controller 140 of FIG. 1. Controller 500 comprises: a comparator (CMP) 501 for comparing the reference voltage $V_{REF}$ with the feedback voltage $V_{FB}$ and outputting a decision D; a low pass filter (LPF) 502 for receiving the decision D and outputting a first intermediate word W1; a round operator 503 for receiving the first intermediate word W1 and outputting a second intermediate word W2; a thermometer-code encoder 504 for receiving the second intermediate word W2 and outputting a N-bit primitive control code PCC[N−1:0]; and a dynamic element matching (DEM) block 505 for receiving the primitive control code PCC[N−1:0] and outputting the control code CC[N−1:0]. The decision D is set to 1 when the reference voltage $V_{REF}$ is higher than the feedback voltage $V_{FB}$; otherwise, the decision D is set to −1. In an embodiment, LPF 502 comprises an integrator for integrating the decision D into the first intermediate word W1 of word length N1. The round operator 503 rounds the first intermediate word W1 into the second intermediate word W2 of word length N2 by keeping only the N2 most significant bits, where N2<N1. The thermometer-code encoder 504 encodes the second intermediate word W2 into the primitive control code PCC[N−1:0] of word length N. By definition of thermometer code, PCC[n] is 1 for n<W2 and is 0 otherwise. DEM 50 maps the primitive control code PCC[N−1:0] into the control code CC[N−1:0] so that the number of bits being asserted are preserved yet the mapping is dynamic. For instance, if N=8, W2=4, then PCC[7:0]= 00001111; in this case, CC[7:0] can be 01010101, or 10101010, or 01101010, or 10011010, and so on.

Preferably, the mapping is dynamic so as to make each bit of the N-bit control code CC[N−1:0] toggle often; this makes the voltage ripple at the load caused by the charge sharing of the corresponding charging capacitor within the switch-capacitor network 110 of FIG. 1 appear to be high-frequency noise that can be readily filtered by the load capacitor $C_L$. As a result, the overall voltage ripple at the load is spectrally shaped to high frequencies and effectively filtered by the load capacitor $C_L$.

An example of dynamic element matching is taught in U.S. Pat. No. 5,684,482, and the principle of spectral shaping is explained therein and thus not described in detail here. In a steady state, the feedback voltage $V_{FB}$ is approximately equal to the reference voltage $V_{REF}$, the N-bit primitive control code PCC[N−1:0] is steady (i.e., either fixed or slightly fluctuating), and the number of bits of the N-bit control code CC[N−1:0] that are asserted is also steady (i.e., either fixed or slightly fluctuating), yet each individual bit of the N-bit control code toggles rather often as a result of using a dynamic element matching.

Referring again to FIG. 1, due to using multi-phase clocking and multiple charging capacitors within the switch-capacitor network 110, the charging-sharing function of the switch network 110 is gradual and smooth, compared with using a simple switch-capacitor circuit. The more clock phases, the smother it is; however, this comes at the cost of higher hardware complexity. Due to using dynamic element matching in the controller 140, the control code is scrambled and the switching noises are spectrally shaped to high frequencies and can be effectively filtered by the switch-capacitor network formed by the switch-capacitor network 110 and the load capacitor $C_L$. In an embodiment, the load capacitor $C_L$ is an external component while the rest of the converter 100 of FIG. 1 is integrated in a single chip. In another embodiment, the entire converter 100 is fully integrated in a single chip.

By integrating all circuits (or all but the load capacitor $C_L$) into a single chip without using external inductor, converter 100 is cost/size effective. Due to using switch-capacitors without static biasing, converter 100 is power efficient. Due to using multi-phase charge sharing along with dynamic element matching, the noise in the load voltage is small.

Although specific embodiments have been illustrated and described herein, it will be appreciated by those of ordinary skill in the art that any arrangement that is calculated to achieve the same purpose may be substituted for the specific embodiments shown. This application is intended to cover adaptations and variations of the embodiments discussed herein. Various embodiments use permutations and/or combinations of embodiments described herein. It is to be understood that the above description is intended to be illustrative, and not restrictive, and that the phraseology or terminology employed herein is for the purpose of description.

What is claimed is:

1. An apparatus comprising:
    a switch-capacitor network receiving a source voltage and outputting a load voltage to a load circuit in accordance with a N-bit control code and a plurality of phase clocks, wherein N is an integer greater than 1;
    a load capacitor for holding the load voltage;
    a feedback network generating a feedback voltage proportional to the load voltage; and
    a controller receiving the feedback voltage and a reference voltage and outputting the N-bit control code in accordance with a clock phase of the plurality of phase clocks,
    wherein the switch-capacitor network comprises a parallel connection of N switch units controlled by the N-bit control code, respectively,
    wherein each of said N switch units comprises: a charging capacitor coupled to the source voltage via a first switch and coupled to the load voltage via a second switch, wherein the first switch and the second switch are controlled by a two-phase non-overlapping clock,
    wherein each of said N switch units further comprises:
        a gating clock generator for generating a gated clock; and
        a two-phase non-overlapping clock generator for generating the two-phase non-overlapping clock from the gated clock.

2. The apparatus of claim 1, wherein the respective bit of the N-bit control code is synchronized by the respective clock phase of the plurality of phase clocks before being used to gate the respective clock phase of the plurality of phase clocks.

3. The apparatus of claim 1, wherein a charge is charged to the charging capacitor from the source voltage via the first switch during a first phase of the two-phase non-overlapping clock, and the charge is shared with the load voltage via the second switch during a second phase of the two-phase non-overlapping clock.

4. The apparatus of claim 1, wherein the apparatus is integrated on a single chip of integrated circuits.

5. An apparatus comprising:
    a switch-capacitor network receiving a source voltage and outputting a load voltage to a load circuit in accordance with a N-bit control code and a plurality of phase clocks, wherein N is an integer greater than 1;
    a load capacitor for holding the load voltage;
    a feedback network generating a feedback voltage proportional to the load voltage; and
    a controller receiving the feedback voltage and a reference voltage and outputting the N-bit control code in accordance with a clock phase of the plurality of phase clocks, wherein the controller comprises:
    a comparator for comparing the reference voltage with the feedback voltage and outputting a decision;
    a low pass filter for filtering the decision into a first intermediate word;
    a round operator for rounding the first intermediate word into a second intermediate word;
    a thermometer-code encoder for encoding the second intermediate word into a N-bit primitive control code; and
    a dynamic element matching block for mapping the N-bit primitive control code into the N-bit control code.

6. The apparatus of claim 5, wherein the low pass filter comprises an integrator.

7. The apparatus of claim 5, wherein the number of bits in the N-bit control code that are asserted are preserved by the mapping of the dynamic element matching block, yet the mapping is dynamic so as to cause each bit of the N-bit control bits to toggle often.

8. A method comprising:
    receiving a source voltage;
    receiving a reference voltage;
    receiving a plurality of phase clocks comprising a plurality of clock phases;
    coupling a load circuit to a load node;
    holding a load voltage at the load node with a load capacitor;
    deriving a feedback voltage from the load voltage such that the feedback voltage is proportional to the load voltage;
    updating a N-bit control code in response to a comparison between the feedback voltage and the reference voltage in a timely manner controlled by one of the plurality of clock phases, wherein N is an integer greater than 1; and
    transferring charge from the source voltage to the load voltage via a switch-capacitor network controlled by the plurality of phase clocks and the N-bit control code, wherein updating the N-bit control code comprises:
    comparing the feedback voltage with the reference voltage to output a decision;
    low-pass filtering the decision into a first intermediate word;
    rounding the first intermediate word into a second intermediate word;
    encoding the second intermediate word into a N-bit primitive control code in accordance with a thermometer code encoding scheme; and
    mapping the N-bit primitive control code into the N-bit control code in accordance with a dynamic element matching scheme.

9. The method of claim 8, wherein deriving the feedback voltage from the load voltage comprises using a resistive voltage divider.

10. The method of claim 8, wherein the low-pass filtering comprises using a digital integrator.

11. The method of claim 8, wherein the dynamic element matching scheme preserves the number of bits that are asserted yet causes each individual bit of the N-bit control code to toggle often.

12. The method of claim 8, wherein the switch-capacitor network comprises N switch units, each of said N switch units comprises a charging capacitor coupled to the source voltage via a first switch and coupled to the load voltage via a second switch, wherein the first switch and the second switch are controlled by a two-phase non-overlapping clock.

13. The method of claim 12, wherein a charge is charged to the charging capacitor from the source voltage via the first switch during a first phase of the two-phase non-overlapping clock, and the charge is shared with the load voltage via the second switch during a second phase of the two-phase non-overlapping clock.

14. The method of claim 12, wherein each of said N switch units further comprises: a gating clock generator for generating a gated clock; and a two-phase non-overlapping clock generator for generating the two-phase non-overlapping clock from the gated clock.

15. The method of claim 14, wherein the respective bit of the N-bit control code is synchronized by the respective clock phase of the plurality of phase clock before being used to gate the respective clock phase of the plurality of phase clock.

16. The method of claim 14, wherein the gated clock is generated according to a respective clock phase of the plurality of phase clocks with a respective bit of the N-bit control code.

* * * * *